UNITED STATES PATENT OFFICE.

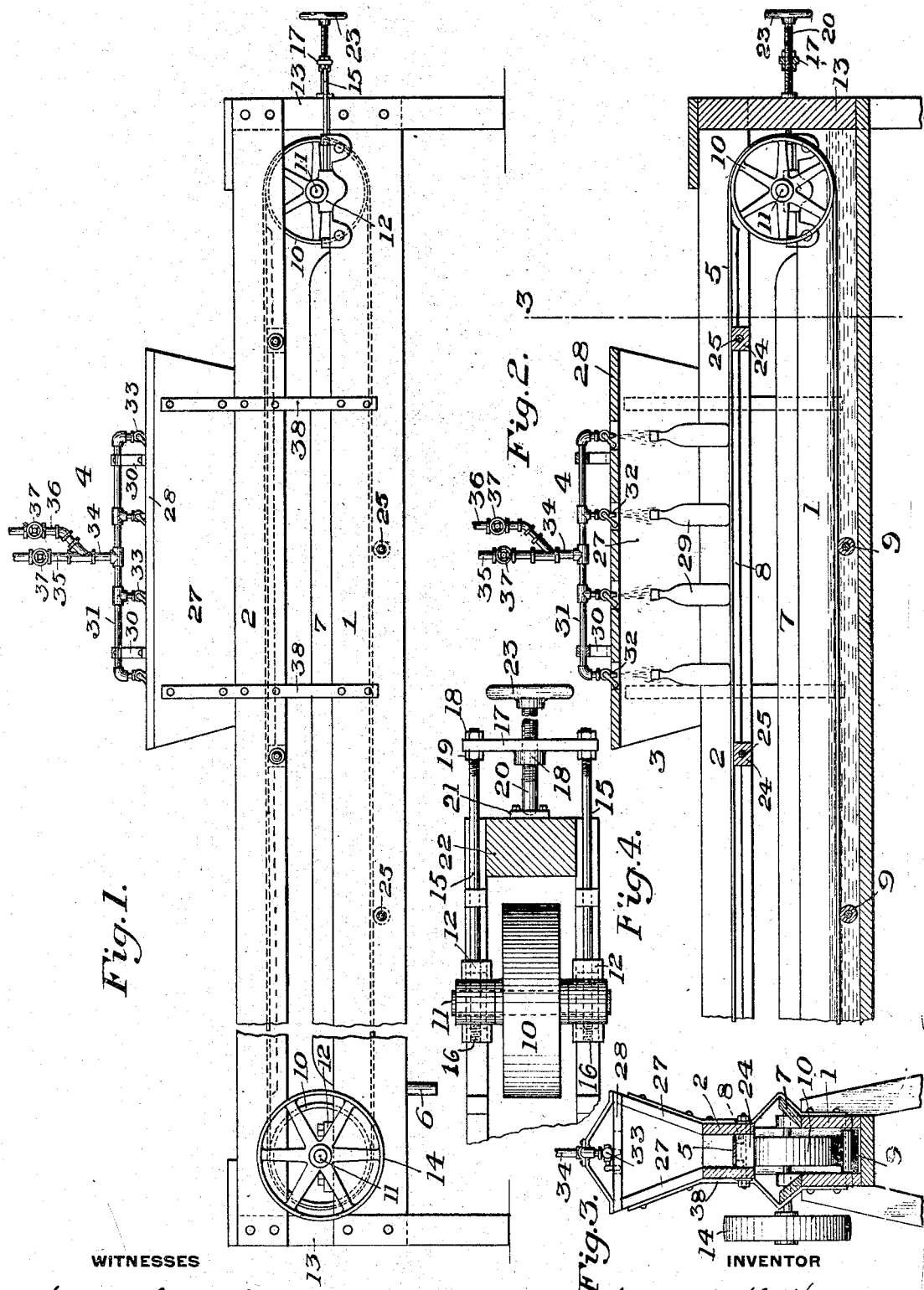

JOSEPH F. HALLER, OF SHERIDAN BOROUGH, PENNSYLVANIA.

BOTTLE-WASHING MACHINE.

No. 900,528.   Specification of Letters Patent.   Patented Oct. 6, 1908.

Application filed May 23, 1908.   Serial No. 434,607.

*To all whom it may concern:*

Be it known that I, JOSEPH F. HALLER, a resident of Sheridan borough, in the county of Allegheny and State of Pennsylvania, have invented a new and useful Improvement in Bottle-Washing Machines, of which the following is a specification.

This invention relates to washing machines and more particularly to machines for washing bottles and similar articles.

The object of the invention is to provide a simple and convenient apparatus for this purpose by means of which the bottles or other articles can be thoroughly washed and which also serves as a conveyer between other apparatus used in the factory or establishment.

For the attainment of the foregoing object the invention comprises a machine constructed and arranged as hereinafter described.

In the accompanying drawings Figure 1 is a side elevation of a machine constructed according to my invention; Fig. 2 is a vertical longitudinal section of the same; Fig. 3 is a vertical transverse section taken on the lines 3—3, Fig. 1; and Fig. 4 is a plan view of the conveyer adjusting means.

The machine comprises a bottom trough 1, top trough 2, hood 3, spraying means 4 and a suitable conveyer or belt 5. The bottom trough 1 is closed at its bottom except for the outlet at 6 and at its upper edge is provided with flaring pieces 7 to catch any splashings or drippings from the upper trough.

The upper trough has an open bottom as shown in Fig. 3 and is provided along its sides with inwardly projecting ledges or cleats 8 for supporting the conveyer belt 5 and hold the same against sagging. The bottom trough also preferably is provided with means of keeping the belt from dragging on its bottom as there is likely to be broken glass in the trough and this would cut the belt. This means is a pair of rollers 9 mounted transversely of the trough. The conveyer is preferably an endless rubber belt or the like. It passes over wheels or sheaves 10, secured to shafts 11 which are mounted in bearings 12 secured to the bottom trough. The upper trough is located some little distance above the other trough as shown, being supported by uprights 13, so giving a convenient space for the location of the wheel carrying shafts. One of these shafts is provided with suitable driving means, such as a pulley 14 and one of them also has its bearings movably mounted and adjustable in order to tighten the belt or conveyer and keep the same stretched.

The tightening means shown comprises a pair of rods 15, having threaded connections at 16 to the bearings or pillow blocks 12, and having their outer ends extending through a cross bar or yoke 17 and provided outside the same with a head 18, or nut riveted thereto. A jam nut 19 may also be used. The yoke or cross bar 17 is provided with a threaded opening through which extends an adjusting screw 20 having its end seated in a socket 21 secured to the end piece 22 of the lower trough and provided at its outer end with the hand wheel 23. The conveyer is tightened by turning the screw 20 as will be readily understood. Should the conveyer not be running squarely over the pulley one or the other of the rods 15 is given a few turns, in that way adjusting the wheel shaft angularly and securing a straight travel of the belt or conveyer.

In order to permit the removal of an endless conveyer, such as a rubber belt which is preferred, the upper trough 2 has the lower edges of its sides connected at intervals by removable cross headers or spacing members 24, the same being removably secured in place by tie bolts 25. The tie bolts and cross members 24 brace the sides of the trough and hold them in proper position relative to each other. To remove the belt or put it in place it is merely necessary to remove tie bolts and cross headers when the belt can be inserted through the open bottom of said trough.

Supported above the upper trough near one end thereof is the hood 3, the same comprising the two side pieces 27 and top or cover 28, but being open at its ends so as to permit the bottles 29 or other articles to be washed to travel through the same. Supported by brackets 30 on the top of the hood is the spray pipe 31 to which are connected a plurality of spray nozzles 32 of any suitable type designed to form a spray of water rather than a solid stream. The ends of these nozzles project down through openings in the cover of the hood. Each of said spray nozzles is preferably provided with a pet cock 33, which not only serves as a cut-off valve, but also to form the spray. The supply pipe 34 is provided with two branches, the branch 35 being designed for a connection to a water supply, while branch 36 is designed for connection to a steam supply in order to give a pulsating flow and cause the water to emerge from the spray nozzles in gushes of considerable violence in order to thoroughly cleanse the bottles or other articles. Each of these branches is provided with a cut-off valve 37. The hood and top and bottom troughs are connected by means of metal straps or braces 38 which serve to tie the troughs together and brace the same, these straps or braces being secured to the outer face of the troughs and hoods.

The machine described is of simple construction and can be built of any desired length. It provides a straight travel for the articles to be cleansed and therefore may serve as a conveyer between different parts of the factory or plant in which located. For instance, the receiving end can be conveniently located adjacent to the filling or corking machine or place, so that the bottles or other receptacles can be taken directly from the latter and placed into the entrance end of the trough. The delivery end of the machine may be located adjacent to the labeling or wrapping machine or place, so that the machine acts as a conveyer as well as for washing and drying. The washing is done near the receiving end of the conveyer and the troughs are of such length that by the time the articles reach the delivery end they are dry. The water while washing is confined by the hood 3 so that it cannot splash out and it passes down through the open bottom of the top trough and into the lower trough, any splashings or drippings being caught by the flaring side pieces 7 of the bottom trough. If desired, the belt may be perforated, but this is not necessary.

What I claim is:

1. A bottle washing machine, comprising upper and lower troughs, shafts mounted at the ends of said troughs, guide wheels on said shafts, an endless conveyer passing over said guide wheels, means in the upper trough supporting the upper reach of said conveyer, and means for holding the conveyer from dragging on the bottom of the lower trough.

2. A bottle washing machine, comprising upper and lower troughs spaced apart, an endless conveyer having its reaches located in said troughs, guide wheels for said conveyer at the ends of said troughs, inwardly projecting ledges in the upper trough upon which said conveyer rests, and means in lower trough for holding said conveyer from dragging on its bottom.

3. A bottle washing machine, comprising upper and lower troughs spaced apart, shafts mounted between said troughs at their ends, guide wheels on said shafts, an endless conveyer passing over said guide wheels, and ledges in the upper trough supporting the upper reach of said conveyer, said lower trough being provided with outwardly flaring upper edges.

4. A bottle washing machine, comprising upper and lower troughs spaced apart, shafts mounted between said troughs at their ends, wheels on said shafts, an endless conveyer working on said wheels, means in the upper trough for holding the conveyer from sagging, and removable cross headers connecting the lower edges of the sides of said upper trough.

5. A bottle washing machine, comprising a trough, shafts mounted at the ends of said trough, wheels on said shafts, an endless conveyer working on said wheels, rods having threaded connections with the bearings of one of said shafts, a yoke or cross head to which said rods are rotatably connected, and a screw for adjusting said yoke longitudinally on the trough.

In testimony whereof, I have hereunto set my hand.

JOSEPH F. HALLER.

Witnesses:
JOHN S. CORT,
F. W. WINTER.